United States Patent
Harrell et al.

(10) Patent No.: US 6,237,934 B1
(45) Date of Patent: May 29, 2001

(54) AIR BAG SYSTEM

(75) Inventors: David J. Harrell, Troy; Walter Dick, Jr., West Bloomfield, both of MI (US); John F. Whitaker, Jonesboro, GA (US); Steven E. Peck, Highland, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/542,540

(22) Filed: Apr. 3, 2000

(51) Int. Cl.⁷ ..................................................... B60R 21/22
(52) U.S. Cl. ...................................... 280/728.3; 280/730.2
(58) Field of Search .............................. 280/728.2, 728.3, 280/730.1, 730.2, 732

(56) References Cited

U.S. PATENT DOCUMENTS

| | | |
|---|---|---|
| 4,768,830 | 9/1988 | Musselwhite . |
| 5,054,845 | 10/1991 | Vogel . |
| 5,498,030 | 3/1996 | Hill et al. . |
| 5,499,840 | 3/1996 | Nakano . |
| 5,505,487 | 4/1996 | Brown et al. . |
| 5,511,821 | 4/1996 | Meyer et al. . |
| 5,540,460 | 7/1996 | Wipasuramonton . |
| 5,542,696 | 8/1996 | Steffens, Jr. et al. . |
| 5,547,214 | 8/1996 | Zimmerman, II et al. . |
| 5,553,887 | 9/1996 | Karlow et al. . |
| 5,556,127 | 9/1996 | Hurford et al. . |
| 5,564,736 | 10/1996 | Kim . |
| 5,564,739 | 10/1996 | Davidson . |
| 5,570,900 | 11/1996 | Brown . |
| 5,588,671 | 12/1996 | Boumarafi et al. . |
| 5,601,332 | 2/1997 | Schultz et al. . |
| 5,630,615 | 5/1997 | Miesik . |
| 5,645,295 | 7/1997 | White, Jr. et al. . |
| 5,651,582 | 7/1997 | Nakano . |
| 5,669,661 | 9/1997 | Pajon . |
| 5,669,662 | 9/1997 | Maly . |
| 5,799,970 | * 9/1998 | Enders ................................ 280/730.2 |
| 5,938,232 | 8/1999 | Kalandek et al. . |
| 5,967,603 | 10/1999 | Genders et al. . |
| 6,003,938 | 12/1999 | Lachat et al. . |
| 6,045,151 | * 4/2000 | Wu .................................... 280/728.3 |
| 6,095,602 | * 8/2000 | Umezawa et al. ................ 297/216.1 |

* cited by examiner

Primary Examiner—Paul N. Dickson
(74) Attorney, Agent, or Firm—Brooks & Kushman P.C.

(57) ABSTRACT

An air bag system includes an inflatable air bag and a housing surrounding the air bag. The housing has first and second portions that are moveable away from each other upon inflation of the air bag. Furthermore, the first and second portions have first and second receptacles, respectively, that are engageable with first and second engaging members, respectively, of a cover material, for securing the cover material to the housing.

22 Claims, 2 Drawing Sheets

AIR BAG SYSTEM

TECHNICAL FIELD

The invention relates to a vehicle air bag system including a housing having receptacles that are engageable with engaging elements of a cover material for securing the cover material to the housing.

BACKGROUND ART

Prior air bag systems for use with motor vehicles include an air bag that deploys through a sewn seam in a cover material. U.S. Pat. No. 5,630,615 to Miesik, for example, shows a vehicle seat including an air bag surrounded by a seat cover, and the air bag penetrates the seat cover by tearing open a sewn seam in the seat cover. Such an arrangement, however, is undesirable for at least two reasons. First, ballooning of the seat cover may occur prior to failure of the seam. Unfortunately, such an occurrence may increase the amount of time required for the air bag to exit the seat. Second, the seat cover may have flaws, such as holes, tears and snags, that may serve as potential exit points for the air bag.

DISCLOSURE OF INVENTION

The invention overcomes the shortcomings of the prior art by providing an improved air bag system that provides efficient and predictable air bag deployment. Such an air bag system may, for example, be incorporated into a vehicle seat as explained below in greater detail.

Under the invention, an air bag system includes an inflatable air bag and a housing surrounding the air bag. The housing has first and second portions that are moveable away from each other upon inflation of the air bag. Furthermore, the first and second portions have first and second receptacles, respectively, that are engageable with first and second engaging members, respectively, of a cover material, for securing the cover material to the housing.

Preferably, the housing comprises a plastic material and has a frangible portion disposed between the receptacles. The frangible portion is configured to break upon inflation of the air bag so that the receptacles can move away from each other.

Further under the invention, an air bag system includes an inflatable air bag and a housing surrounding the air bag. The housing has first and second portions that are moveable away from each other upon inflation of the air bag. Furthermore, the first and second portions have first and second receptacles, respectively. The air bag system also includes a cover material that surrounds the housing, and the cover material has first and second sections. First and second engaging elements are connected to the first and second sections, respectively, and are disposed in the first and second receptacles, respectively, such that the engaging elements are moveable with the receptacles. When the air bag inflates, the receptacles move away from each other, thereby causing the sections of the cover material to move away from each other.

A vehicle seat according to the invention includes a frame and an air bag module connected to the frame. The module includes an inflatable air bag and a housing surrounding the air bag. The housing has first and second portions that are moveable away from each other upon inflation of the air bag. Furthermore, the first and second portions have first and second receptacles, respectively. The vehicle seat also includes a cover material surrounding the module and the frame, and the cover material has first and second sections. First and second engaging elements are connected to the first and second sections, respectively, and are disposed in the first and second receptacles, respectively, such that the engaging elements are moveable with the receptacles. With such a configuration, when the air bag inflates, the receptacles move away from each other, thereby causing the sections of the cover material to move away from each other.

For the air bag system and vehicle seat described above, the first and second receptacles may include first and second notches, respectively. The first and second engaging elements may also include first and second projections, respectively, that are engageable with the first and second notches, respectively.

Preferably, each of the engaging elements is plastic and has an arrow-shape. With such a configuration, the engaging elements may be easily inserted into the receptacles. Furthermore, the first and second engaging elements are preferably sewn to the first and second sections, respectively, of the cover material.

Further under the invention, a vehicle seat includes a frame and an air bag module connected to the frame. The module has an air bag and a housing surrounding the air bag. The housing has first and second receptacles and a rupturable portion disposed between the receptacles. Furthermore, the first and second receptacles have first and second notches, respectively. The seat also includes a cover material disposed about the module and frame, and the cover material has first and second sections. First and second plastic elements are connected to the first and second sections, respectively, and are disposed in the first and second receptacles, respectively. The first and second plastic elements have first and second projections, respectively, that are engageable with the first and second notches, respectively, so that the plastic elements are moveable with the receptacles. When the air bag is deployed, the rupturable portion ruptures so as to separate the first and second receptacles, thereby separating the first and second sections of the cover material and allowing the air bag to be released from the housing.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
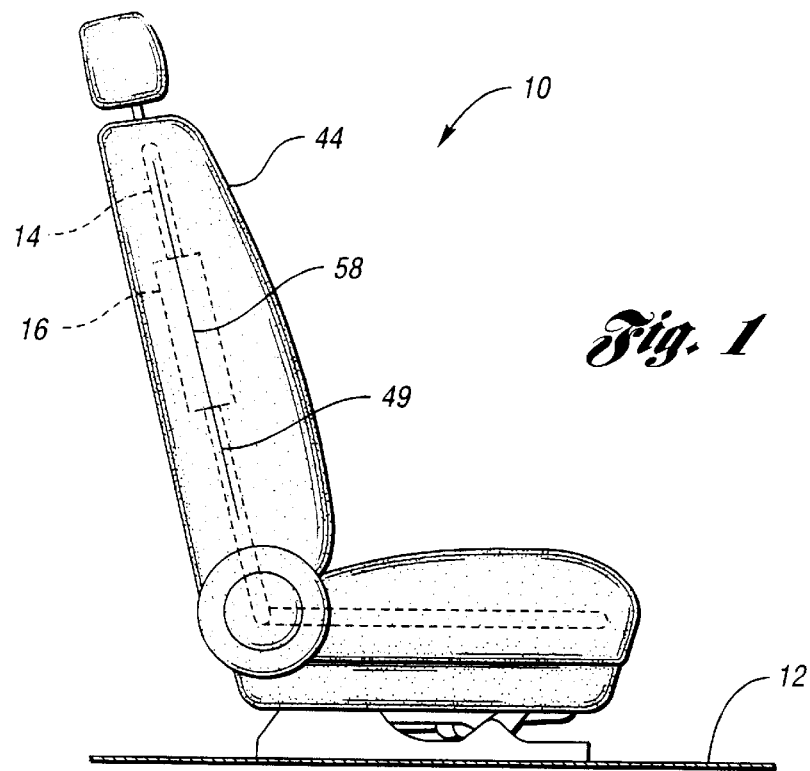
FIG. 1 is a side view of a vehicle seat according to the invention and including an air bag module attached to a frame.
Figure 2:
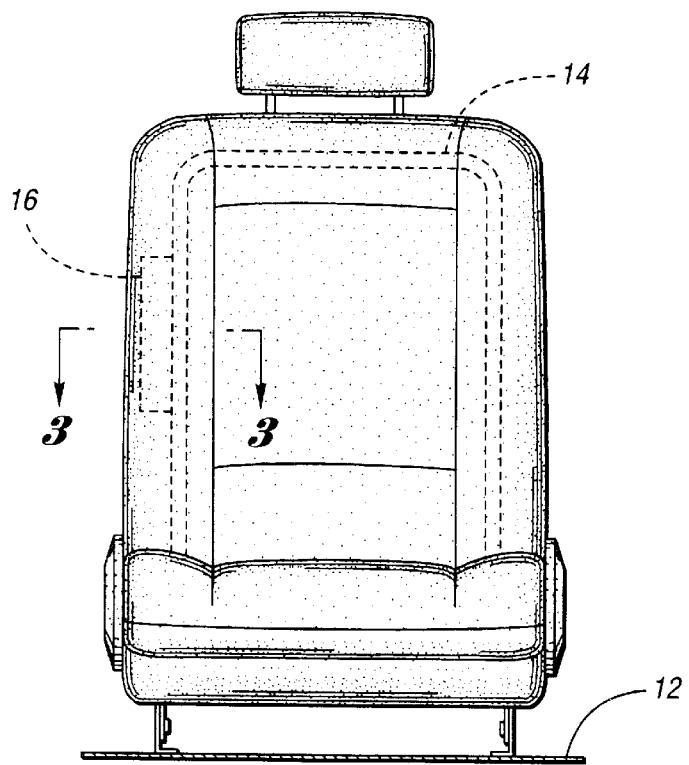
FIG. 2 is a front view of the vehicle seat.
Figure 3:
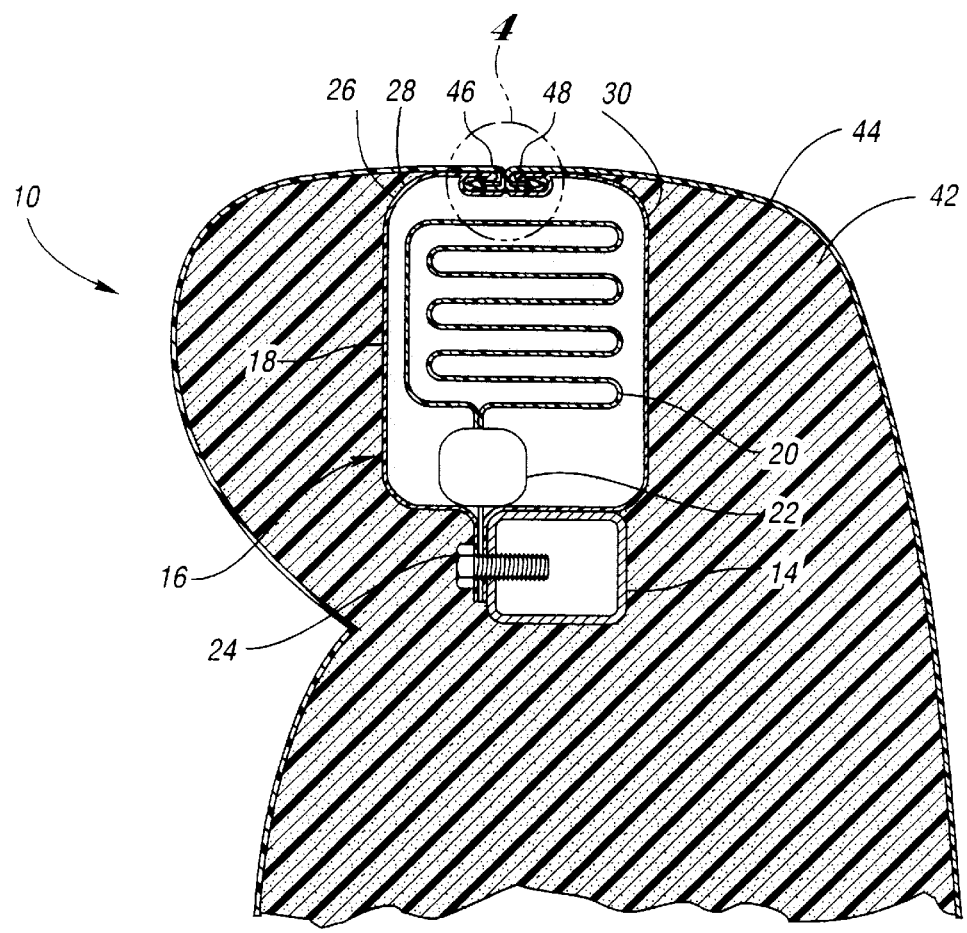
FIG. 3 is a cross-sectional view of the vehicle seat taken along line 3—3 of FIG. 4 and showing a housing of the air bag module connected to first and second sections of a cover material.

FIGS. 1 and 2 show a vehicle seat 10 according to the invention mounted in a vehicle 12. The seat 10 has a frame 14 an air bag system or module 16 connected to the frame 14. As shown in FIG. 3, the module 16 includes a housing 18 that surrounds an inflatable air bag 20, and an inflator 22 connected to the air bag 20 for inflating the air bag 20. The inflator 22 may be connected to the frame 14 in any suitable manner, such as with a fastener 24. The fastener 24 may also be used to connect the housing 18 to the frame 14. Alternatively, the module 16 may be connected to the frame 14 in any suitable manner.

Figure 4:
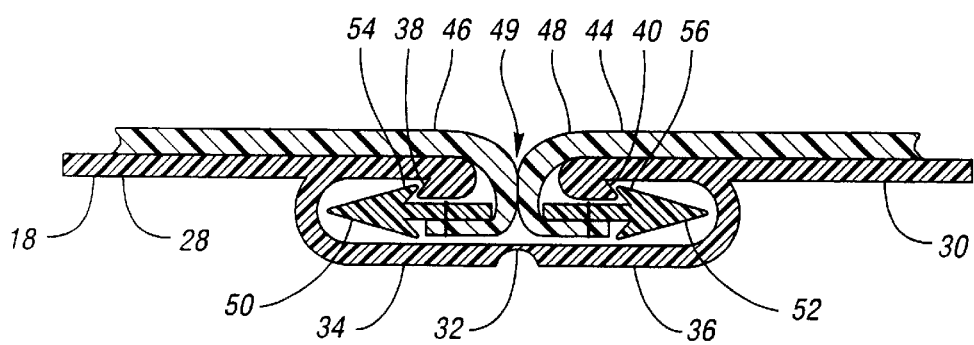
FIG. 4 is an enlarged view of a portion of FIG. 3 showing the connection between the housing and the cover material.

The housing 18 preferably has a clam-shell body 26 that comprises a molded plastic material, such as polypropylene. Alternatively, the body 26 may be made of any suitable material and in any suitable manner. Furthermore, the body 26 has first and second portions 28 and 30, respectively, that are joined together by a rupturable portion, such as a frangible groove or seam 32 as shown in FIG. 4. Alternatively, the portions 28 and 30 may joined in any suitable manner such that the portions 28 and 30 may separate or move away from each other upon inflation of the air bag 20. For example, the portions 28 and 30 may be connected together by a breakable fastener.

As further shown in FIG. 4, the first and second portions 28 and 30 have first and second receptacles 34 and 36, respectively, that preferably each have a J-shaped cross-section. The first and second receptacles 34 and 36 have first and second grooves or notches 38 and 40, respectively.

Referring to FIGS. 3 and 4, the seat 10 further includes padding such as foam 42 disposed adjacent the frame 14 and the module 16, and a cover material or trim cover 44 that surrounds the frame 14, module 16 and foam 42. The trim cover 44 has first and second sections 46 and 48, respectively, that define a seam 49. While the trim cover 44 may be made of any suitable material, the trim cover 44 preferably comprises fabric, vinyl and/or leather.

First and second engaging elements 50 and 52, respectively, are connected in any suitable manner to the first and second sections 46 and 48, respectively, of the trim cover 44. For example, the elements 50 and 52 may be sewn, tacked or glued to the sections 46 and 48. Furthermore, the first and second elements 50 and 52, respectively, are disposable in the first and second receptacles 34 and 36, respectively. While the elements 50 and 52 may comprise any suitable material and be made in any suitable manner, the elements 50 and 52 preferably comprise nylon or extruded plastic material, such as polypropylene, that is sufficiently flexible so that the elements 50 and 52 may be easily inserted into the receptacles 34 and 36. Because the elements 50 and 52 are connected to the sections 46 and 48 of the trim cover 44, the elements 50 and 52 may be considered part of the trim cover 44.

The first and second elements 50 and 52, respectively, have first and second projections 54 and 56, respectively, that are engageable with the first and second notches 38 and 40, respectively, so that the elements 50 and 52 are moveable with the receptacles 34 and 36. Each of the elements 50 and 52 may also be provided with one or more additional projections that may be engageable with one or more additional grooves or notches (not shown) in a respective receptacle 34 or 36. Preferably, each of the elements 50 and 52 has an arrow-shape as shown in FIG. 4. Alternatively, the elements 50 and 52 and receptacles 34 and 36 may be provided with any suitable configuration such that the elements 50 and 52 are engageable with the receptacles 34 and 36.

Referring to FIGS. 1 through 4, to assemble the seat 10, the module 16 may be connected to the frame 14 with the fastener 24. Next, the foam 42 may positioned about the frame 14 and module 16, and attached to the frame 14 and/or module 16. The trim cover 44 with the elements 50 and 52 already attached thereto may then be placed over the foam 42, and the elements 50 and 52 may be snapped or otherwise inserted into the receptacles 34 and 36 to form a portion 58 of the seam 49 disposed adjacent the module 16. Preferably, each of the elements 50 and 52 extends substantially the entire length of the portion 58 of the seam 49. Alternatively, multiple elements similar to the elements 50 and 52 may be attached to each of the sections 46 and 48 of the trim cover 44, so that multiple elements will extend along the portion 58 of the seam 49. Furthermore, the remainder of the seam 49 above and below the module 16 may be formed by sewing or otherwise attaching together the sections 46 and 48.

When the air bag 20 is inflated by the inflator 22, the frangible seam 32 breaks so that the first and second portions 28 and 30 of the housing 18 may separate and move away from each other. Because the elements 50 and 52 are disposed in and moveable with the receptacles 34 and 36, the sections 46 and 48 of the trim cover 44 also separate and move away from each other so that the air bag 20 may extend beyond the housing 18.

Because the sections 46 and 48 of the trim cover 44 automatically separate when the housing portions 28 and 30 separate, the invention provides efficient and predictable air bag deployment. More specifically, the invention reduces or eliminates ballooning of the trim cover 44 during deployment of the air bag 20, which reduces the amount of time required for the air bag 20 to deploy. Furthermore, because the invention provides precise separation of the trim cover 44, the air bag 20 is able to deploy without being diverted by the trim cover 44.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An air bag system comprising:
   an inflatable air bag; and
   a housing surrounding the air bag, the housing having first and second portions that are moveable away from each other upon inflation of the air bag, the first and second portions having first and second receptacles, respectively, the first and second receptacles having first and second notches, respectively, that are engageable with first and second projections, respectively, of a cover material, for securing the cover material to the housing.

2. The air bag system of claim 1 wherein the housing comprises a plastic material and has a frangible portion disposed between the receptacles.

3. An air bag system comprising:
   an inflatable air bag;
   a housing surrounding the air bag, the housing having first and second portions that are moveable away from each other upon inflation of the air bag, the first and second portions having first and second receptacles, respectively;
   a cover material surrounding the housing, the cover material having first and second sections; and
   first and second engaging elements connected to the first and second sections, respectively, and disposed in the first and second receptacles, respectively, such that the engaging elements are moveable with the receptacles, each engaging element having an arrow shape;

wherein when the air bag inflates, the receptacles move away from each other, thereby causing the sections of the cover material to move away from each other.

4. The air bag system of claim 3 wherein the housing has a frangible portion disposed between the receptacles.

5. The air bag system of claim 3 wherein the first and second receptacles have first and second notches, respectively, and the first and second engaging elements have first and second projections, respectively, that are engageable with the first and second notches, respectively.

6. The air bag system of claim 3 wherein the engaging elements are plastic.

7. The air bag system of claim 3 wherein the first and second engaging elements are sewn to the first and second sections, respectively, of the cover material.

8. A vehicle seat comprising:

a frame;

an air bag module connected to the frame, the module including an inflatable air bag and a housing surrounding the air bag, the housing having first and second portions that are moveable away from each other upon inflation of the air bag, the first and second portions having first and second receptacles, respectively, the first and second receptacles having first and second notches, respectively;

a cover material surrounding the module and the frame, the cover material having first and second sections; and first and second engaging elements connected to the first and second sections, respectively, and disposed in the first and second receptacles, respectively, the first and second engaging elements having first and second projections, respectively, that are engageable with the first and second notches, respectively, such that the engaging elements are moveable with the receptacles;

wherein when the air bag inflates, the receptacles move away from each other, thereby causing the sections of the cover material to move away from each other.

9. The air bag system of claim 8 wherein the housing has a frangible portion disposed between the receptacles.

10. The air bag system of claim 8 wherein the engaging elements are plastic.

11. The air bag system of claim 8 wherein each engaging element has an arrow- shape.

12. The air bag system of claim 8 wherein the first and second engaging elements are sewn to the first and second sections, respectively, of the cover material.

13. A vehicle seat comprising:

a frame;

an air bag module connected to the frame and having an air bag and a housing surrounding the air bag, the housing having first and second receptacles and a rupturable portion disposed between the receptacles, the first and second receptacles having first and second notches, respectively;

a cover material disposed about the module and frame, the cover material having first and second sections; and first and second plastic elements connected to the first and second sections, respectively, and disposed in the first and second receptacles, respectively, the first and second plastic elements having first and second projections, respectively, that are engageable with the first and second notches, respectively, so that the plastic elements are moveable with the receptacles;

wherein when the air bag is deployed, the rupturable portion ruptures so as to separate the first and second receptacles, thereby separating the first and second sections of the cover material and allowing the air bag to be released from the housing.

14. An air bag system comprising:

an inflatable air bag;

a housing surrounding the air bag, the housing having first and second portions that are moveable away from each other upon inflation of the air bag, the first portion having a first receptacle;

a cover material surrounding the housing and having first and second sections, the first section including a first engaging element that is snap fit into the first receptacle such that the first engaging element is moveable with the first receptacle, the second section being connected to the second portion;

wherein when the air bag inflates, the portions of the housing move away from each other, thereby causing the sections of the cover material to move away from each other.

15. The air bag system of claim 14 wherein the first receptacle includes a first notch that is engageable with the first engaging element.

16. The air bag system of claim 14 wherein the first engaging element includes a first projection that is engageable with the first receptacle.

17. The air bag system of claim 14 wherein the first engaging element has an arrow-shape.

18. The air bag system of claim 14 wherein the first and second sections of the cover material comprise a first material, and the first engaging element comprises a second material different than the first material.

19. The air bag system of claim 14 wherein the second portion of the housing includes a second receptacle, and the second section of the cover material includes a second engaging element that is snap fit into the second receptacle such that the second engaging element is moveable with the second receptacle.

20. The air bag system of claim 19 wherein the first receptacle includes a first notch that is engageable with the first engaging element, and the second receptacle includes a second notch that is engageable with the second engaging element.

21. The air bag system of claim 19 wherein the first engaging element includes a first projection that is engageable with the first receptacle, and the second engaging element includes a second projection that is engageable with the second receptacle.

22. The air bag system of claim 19 wherein the first and second sections of the cover material comprise a first material, and the engaging elements comprises a second material different than the first material.

* * * * *